(12) United States Patent
Smago et al.

(10) Patent No.: US 7,631,077 B2
(45) Date of Patent: Dec. 8, 2009

(54) METHOD FOR PROVIDING HARMONIZED PUBLIC SECURITY AND SAFETY SERVICES AND CORRESPONDING SERVICE PLATFORM

(76) Inventors: Carsten Smago, Gartenstrasse 46, 71634 Ludwigsburg (DE); Dieter Kopp, Brandstrasse 1, 75428 Illingen (DE); Peter Domschitz, Stresemannstrasse 94, 70191 Stuttgart (DE); Klaus Stocker, Zwergenweg 11, 70567 Stuttgart (DE); Marco Tomsu, Adalbert-Stifter-Strasse 12, 71254 Ditzingen (DE)

( * ) Notice: Subject to any disclaimer, the term of this patent is extended or adjusted under 35 U.S.C. 154(b) by 635 days.

(21) Appl. No.: 11/354,925

(22) Filed: Feb. 16, 2006

(65) Prior Publication Data

US 2006/0209747 A1    Sep. 21, 2006

(30) Foreign Application Priority Data

Feb. 18, 2005    (EP)    ................................. 05003502

(51) Int. Cl.
*G06F 15/173* (2006.01)
(52) U.S. Cl. .................. 709/225; 709/223; 370/352; 370/401; 370/404
(58) Field of Classification Search ............. 370/328; 709/206, 204; 455/411, 413
See application file for complete search history.

(56) References Cited

U.S. PATENT DOCUMENTS

| 6,600,734 | B1 * | 7/2003 | Gernert et al. ............... 370/352 |
| 7,177,398 | B2 * | 2/2007 | Meer et al. .................... 379/45 |
| 2004/0103158 | A1 * | 5/2004 | Vella et al. .................. 709/206 |
| 2004/0142704 | A1 * | 7/2004 | Scholz ..................... 455/456.1 |
| 2005/0201359 | A1 * | 9/2005 | Nelson et al. ............... 370/352 |
| 2005/0204050 | A1 * | 9/2005 | Turley et al. ................ 709/229 |

* cited by examiner

*Primary Examiner*—Ayaz R Sheikh
*Assistant Examiner*—Faiyazkhan Ghafoerkhan
(74) *Attorney, Agent, or Firm*—Fay Sharpe LLP

(57) ABSTRACT

A method and system for providing harmonized public security and safety services to multiple public security and safety control centers, the public security and safety control centers being adapted to control terminals over at least one access communication network. The method includes the following steps: providing multiple public security and safety control centers access to a service platform, with the service platform containing an application server layer and a communication layer; upon service request of one of the public security and safety control centers, executing a corresponding application on the application server layer of the service platform, the application generating at least one command to be executed in one of the access communication networks; forwarding the command said the communication layer to the appropriate gateway and executing the command in the access communication network.

20 Claims, 2 Drawing Sheets

METHOD FOR PROVIDING HARMONIZED PUBLIC SECURITY AND SAFETY SERVICES AND CORRESPONDING SERVICE PLATFORM

BACKGROUND OF THE INVENTION

The invention is based on a priority application EP 05003502.1 which is hereby incorporated by reference.

The present invention relates to a method for providing harmonized public security and safety services to a plurality of public security and safety control centers.

The communication tools used by security and safety services as police, fire departments, rescue services have to be efficient in order to react as soon as possible to emergency and involve in the communication the whole team which needs to intervene in the field.

Examples of services that such communication tools must be able to provide can be:
- Receiving emergency calls and triggering broadcast calls to a pre-selected group of professionals located in the neighborhood of the person having placed the emergency call.
- Alarming a group of professionals over a plurality of possible communication devices (dedicated radio terminal, public mobile phone, pager).
- Making group calls for a group of professionals to be kept on the same level of information, and possibly defining a coordinator who has priority in the group call.
- Sending and receiving Short Data Messages containing information relevant for the professionals in the field.

These communication tools usually comprise a plurality of public security and safety control centers which are connected to a dedicated Professional Mobile Radio (PMR) network. Up to the last decade such PMR networks were most analog and not interconnected. Each region and each security and safety organization had its own PMR. Due to political decisions, the trend is now to equip the different European countries with digital PMR networks and to provide a "unifying" infrastructure capable of interconnecting multiple organizations or of interoperating at borders with other national networks in order to enhance the mutual cooperation between European countries.

The digital PMR networks are usually based on one of the following technologies: TETRA (Terrestrial Trunked Radio), TETRAPOL, GSM with ASCI features.

The current PMR landscape is a juxtaposition of heterogeneous technologies as analog PMR coexists with digital ones compatible to different standards. FIG. 1 illustrates the state of the art PMR landscape. FIG. 1 represent a plurality of islands of control centers CO1, . . . , CO4 each island of control centers being associated to one organization for example CO1 groups control centers of the fire department, CO2 central centers of the police region 1 and CO3 central centers of the police region 2 and CO4 central centers of emergency services.

Each island of central centers are relying on one or more transport technologies. For example, CO1 is connected to an analog PMR, CO2 to a TETRA PMR and a paging network, CO3 to a GSM/UMTS PMR and CO4 to a WLAN network.

A drawback of the current situation is that the services implemented at the control centers must be adapted to the underlying transport network in order to work. An application working in a TETRA PMR cannot be ported to another type of PMR without expensive and time intensive adaptation or replacement. The PMR are proprietary solutions without unifying a network between the control centers is the latter are not relying on the same transport technology. As a consequence, harmonized services may remain a cost intensive burden.

A particular object of the present invention is to provide a method for providing harmonized public security and safety services over a plurality of access communication networks.

Another object of the invention is to provide a corresponding service platform.

SUMMARY OF THE INVENTION

These objects, and others that appear below, are achieved by a method for providing harmonized public security and safety services over a plurality of access communication networks according to claim 1, and a service platform according to claim 10.

According to the present invention, the method for providing harmonized public security and safety services over a plurality of access communication networks relies on the fact that a service platform accessible by the control centers comprises on the one hand an application server layer gathering the applications for providing a plurality of predefined services and on the other hand a communication layer for selecting the appropriate access communication network on which the service should be performed.

The method according to the present invention presents the advantage to reduce the burden to adapt services to the different access communication network technologies. The adaptation is only to be performed on the service platform and no more on each control center.

The method according to the present invention further presents the advantage to ease the transfer of service used up to now in one organization to other organizations since all services will be accessible from the service platform by all the control centers.

Further advantageous features of the invention are defined in the dependent claims.

BRIEF DESCRIPTION OF THE DRAWINGS

Other characteristics and advantages of the invention will appear on reading the following description of a preferred embodiment given by way of non-limiting illustrations, and from the accompanying drawings, in which.

DETAILED DESCRIPTION OF THE INVENTION

Figure 1:
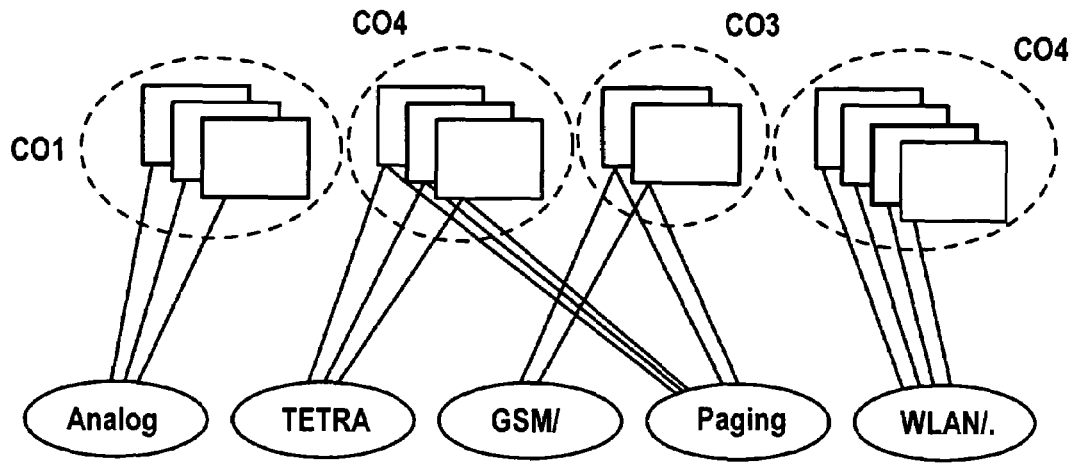
FIG. 1 shows an illustration of the current PMR landscape.

FIG. 1 has already been described in relation with the prior art.

Figure 2:
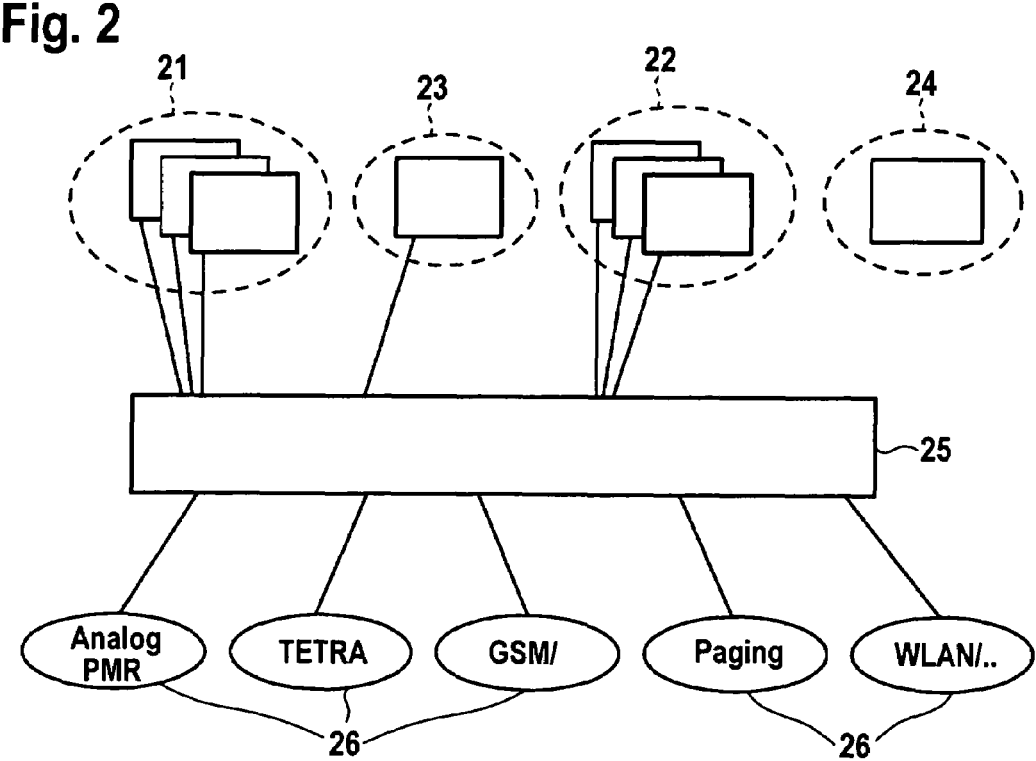
FIG. 2 shows an illustration of public safety and security networks according to the present invention.

FIG. 2 shows an illustration of public safety and security networks according to the present invention. The public safety and security networks landscape according to the present invention comprises islands of control centers 21, 22, single control centers 22, 23, a service platform 25 and a plurality of access communication networks 26.

The islands of control centers 21, 22 may comprise several control centers associated to one organization as reflected in prior art. Other control centers 23, 24 may be new control centers adopted to the feature of the present invention and designed for supra-organization control. To summarize, the present invention can be used with existing control center infrastructures as well as with new control centers which would take into account the features of the present invention. In the framework of the present invention control centers 24 may be mobile control centers for example established on board of a vehicle and connected over a radio link to a radio communication network 26.

The island of control centers 21, 22 respectively control centers 23, 24 are logically connected to a service platform 25 which comprises a application server layer and a communication layer. Service platform 25 as well as its logical connections will be described in details in connection with FIG. 3.

The service platform 25 is as well logically connected to a plurality of access communication networks 26 which may be, on the one hand, radio communication networks as analog PMR, digital PMR based on TETRA, TETRAPOL, GSM/UMTS, Wireless Broadband Access technologies or Digital Audio Broadcast (DAB) networks. On the other hand, the access communication networks may be fixed access communication networks as PSTN/ISDN, ADSL. Further the access networks may be pager networks.

It will be understood by those skilled in the art that this enumeration is not to be seen as restrictive but any other known access communication networks may be used in combination with the method according to the present invention.

Figure 3:
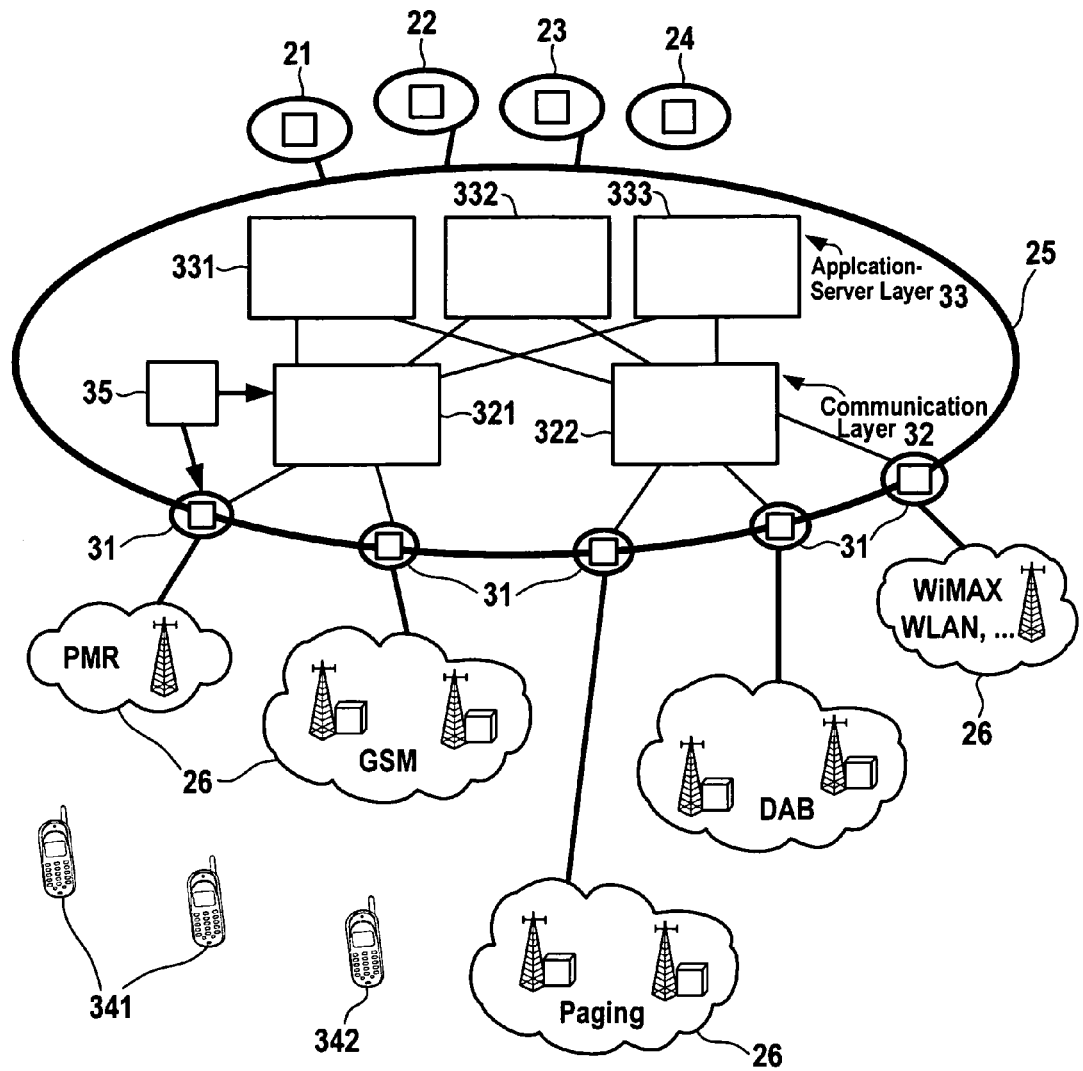
FIG. 3 shows an hierarchical representation of the service platform for harmonized service provision according to the present invention.

FIG. 3 shows an hierarchical representation of the service platform for harmonized service provision according to the present invention.

The access of control centers 21, . . . , 24 to the application server layer 33 is performed as follows:

The control center 21, . . . , 24 generates a service request. The service request should be selected out of a set of available service requests. Possible service request may be the request to establish a group call, the request for alarming a predefined person, the request for location based alarming, the request for providing graphical data to a set of persons, and so on.

For sending the service request, the control centers 21, . . . , 24 establishes a connection to the gateway 31 of one access network 26. Preferably, if the control center 21, . . . , 24 is part of an existing PMR working over one access technology, the gateway to this PMR will be addressed. In case of evolved multi-standard control centers, which may be envisaged in the framework of the present invention, any one of gateway 31 to one supported access technology 26 may be addressed.

Then, gateway 31 forwards the service requests to the communication layer 32. Communication layer 32 comprises preferably one or more packet-oriented transport domains with entities 321, 322 for media/data and signaling processing and switching functionality.

The communication layer selects the appropriate application server 331, . . . , 333 for sending the service request.

Preferably, the gateway 31 comprises a table indicating to which communication layer domain 321, 322 it should forward the service request depending on the originator of the service request.

The same way the communication layer domain 321, 322 comprises a table for selecting the appropriate application layer 331, . . . , 333 for handling the service request. The originator address but also the type of request may be considered for determining the appropriate application server 331, . . . , 333.

Then, the application server 331, . . . , 333 executes the request. For this purpose, it may interrogate a common database as for example a GIS (Geographical Information Service) database, a database comprising fingerprint information and so on. The application server 331, . . . , 333 may also interrogate further centralized servers for example a unified identity management module which comprises user profiles defining inter alia the user rights, the user contact possibility . . . . Other feature of the application servers 331, . . . , 333 may be contact center applications, workflow management, workforce management, encryption.

The databases, as well as the applications running on the application servers are preferably distributed in the whole application layer. The most critical may also be replicated. The application layer comprises also self healing mechanisms which enables it to recover when an equipment of the application layer has failed.

The result of the request execution is a list of commands which are directed to the access networks 26. The command are forwarded to the communication layer 32 which forward them to the different gateways 31. The gateways 31 then take care for the execution of the commands in the respective access networks 26. For example, the result of a group call request will be a list of calls to be performed in different access communication networks 26. Some calls could be performed on the PMR network for persons on duty having their dedicated emergency terminal 341 activated and some other calls could be performed on the GSM network because some other persons are registered in the unified identity management module as currently not on duty and more likely to have their GSM mobile phone 342 active than their emergency terminal 341.

In a preferred embodiment of the present invention, the terminal 341, 342 themselves may also be able to place a service request so that they can be granted access to an application server 331, . . . , 333 after an authentication procedure. The service request is forwarded over the gateway 31 and the communication layer 32 to the application server 331, . . . 333. The result of the execution is a command to be executed on the access communication network 26. This command can either be destined to terminals 341, 342 or to control centers 21, . . . , 24.

In another preferred embodiment of the present invention, the application server 331, . . . , 333 is responsible for providing a feedback tracking the execution of the list of command to the entity which had generated the service request e.g. control center 21, . . . , 24 or terminals 341, 342.

In still another preferred embodiment of the present invention, an intelligent border element 35 located in the communication layer is responsible for managing clusters which associate a set of control centers 21, . . . , 24 to a set of applications in the application server layer 33 so that in usual operation mode the different security and safety organizations can work on separate domain of the application server layer 33 while using the same access communication network infrastructures 26. Indeed, for regulatory reasons, it is for example necessary that the police department applications cannot be accessed by the fire department users.

Another feature of the intelligent border element 35 would be to manage a disaster operation mode in which the separation between the different domains is removed for a time in order to ease the communication between the different security and safety organizations. In such a case, all control centers 21, . . . , 24 and users would share the same applications and the coordination will be much more efficient. Intelligent border element 35 controls an on-demand collaboration between domains of the application server layer 33.

In still another preferred embodiment of the present invention, the application server layer comprises a presentation server adapted to control the user interface for a plurality of users, the users being either control centers 21, . . . , 24 or terminals 341, 342. As a consequence, the information displayed on the terminals or on the control centers are defined at the presentation server. Terminals belonging to different access communications networks 26 can have the same template of information displayed on their screen.

The presentation server comprises also means for dynamically building groups of users upon occurrence of an emergency situation.

Furthermore, the presentation layer may be used to configure on purpose a terminal as having the functionality of a control center or the other way round a control center as having the functionality of a terminal.

The presentation server is in the application server layer the pendant to the intelligent border element in the communication layer. The presentation server enables it flexibly and on-purpose create new and adequate configurations in the network.

The invention claimed is:

1. Method for providing harmonized public security and safety services to a plurality of public security and safety control centers, said public security and safety control centers being adapted to control terminals over at least one access communication network, said method comprising the steps of:
   Providing access to said plurality of public security and safety control centers to a service platform, said service platform comprising an application server layer and a communication layer;
   Interfacing communication layer of said service platform with said at least one access communication network over at least one gateway;
   Upon service request of one of said public security and safety control centers, executing a corresponding application on said application server layer of said service platform; said application generating at least one command to be executed in at least one of said access communication networks;
   Forwarding said at least one command over said communication layer to the appropriate gateway and executing said command in said access communication network;
   Defining at least two clusters associating a set of public security and safety control centers to a set of applications in said application server layer;
   Controlling at an intelligent border element belonging to said communication layer that public security and safety control centers belonging to a cluster only access to applications in their cluster in usual operation mode.

2. Method according to claim 1, further comprising the steps of:
   Providing access to said terminals to said service platform after authentication procedures;
   Upon service request of one terminal, executing a corresponding application on said application server layer, said application generating at least one command to be executed in an access communication network;
   Forwarding said at least one command over said communication layer to the appropriate gateway and executing said command in said access communication network.

3. Method according to claim 1, further comprising the step of forwarding a feedback from said application server layer to said public security and safety control center tracking the execution of said command in said access communication network.

4. Method according to claim 1, wherein said application server layer comprises at least one of following applications: contact center application, workflow management, workforce management application, user profile administration application, database access application, encryption.

5. Method according to claim 1, wherein said communication layer comprises one or more packet-oriented transport domains with entities for media/data and signaling processing and switching functionality.

6. Method according to claim 1, wherein said plurality of access communication networks comprises radio access networks as analog Professional Mobile Radio network, digital Professional Mobile Radio Network as TETRA network or TETRAPOL network, Paging system, GMS/UMTS network, wireless broadband access network or Digital Audio Broadcast network.

7. Method according to claim 1, wherein said plurality of access communication networks comprises fixed access networks as PSTN/ISDN networks or wireline broadband access network.

8. Method according to claim 1, further comprising the step of:
   Enabling at said intelligent border element that public security and safety control centers access to applications out-of their cluster in disaster operation mode.

9. Service platform for providing harmonized public security and safety services to a plurality of public security and safety control centers adapted to control terminals over at least one access communication network, said service platform comprising:
   an application server layer and a communication layer;
   interfaces with said at least one of access communication network over at least one gateway;
   an intelligent border element belonging to said communication layer;
   means for defining at least two clusters associating a set of public security and safety control centers to a set of applications in said application server layers;
   means for executing an application on said application server layer upon service request of one of said public security and safety control centers and means for generating at least one command to be executed in at least one of said access communication networks;
   means for forwarding said at least one command over said communication layer to the appropriate gateway.

10. Service platform according to claim 9, wherein said intelligent border element is adapted to manage an usual operation mode where cluster should operate separately from one another and a disaster operation where said intelligent border element removes on-demand the separation between said clusters.

11. Service platform according to claim 9, further comprising:
   means for providing access from said terminals to said service platform after authentication procedures;
   means for executing a corresponding application on said application server upon a service request of one terminal, said application generating at least one command to be executed in an access communication network;
   means for forwarding said at least one command over said communication layer to the appropriate gateway and executing said command in said access communication network.

12. Service platform according to claim 9, wherein said plurality of access communication networks comprises radio access networks as analog Professional Mobile Radio network, digital Professional Mobile Radio Network as TETRA network or TETRAPOL network, Paging system, GMS/UMTS network, wireless broadband access network or Digital Audio Broadcast network.

13. Service platform according to claim 9, wherein said plurality of access communication networks comprises fixed access networks as PSTN/ISDN networks or wireline broadband access network.

14. Service platform according to claim 9, wherein said communication layer comprises one or more packet-oriented transport domains with entities for media/data and signaling processing and switching functionality.

15. Method for providing harmonized public security and safety services to a plurality of public security and safety control centers, said public security and safety control centers being adapted to control terminals over at least one access communication network, said method comprising the steps of:
Providing access to said plurality of public security and safety control centers to a service platform, said service platform comprising an application server layer and a communication layer;
Interfacing communication layer of said service platform with said at least one access communication network over at least one gateway;
Upon service request of one of said public security and safety control centers, executing a corresponding application on said application server layer of said service platform; said application generating at least one command to be executed in at least one of said access communication networks;
Forwarding said at least one command over said communication layer to the appropriate gateway and executing said command in said access communication network.
Controlling at a presentation server belonging to the application server layer the user interface for a plurality of users, said users being either control centers or terminals.

16. Method according to claim 15, further comprising the step of:
Defining at least two clusters associating a set of public security and safety control centers to a set of applications in said application server layers,
Controlling at an intelligent border element belonging to said communication layer that public security and safety control centers belonging to a cluster only access to applications in their cluster in usual operation mode;
Enabling at said intelligent border element that public security and safety control centers access to applications out-of their cluster in disaster operation mode.

17. Method according to claim 15, further comprising the steps of:
Providing access to said terminals to said service platform after authentication procedures;
Upon service request of one terminal, executing a corresponding application on said application server layer, said application generating at least one command to be executed in an access communication network;
Forwarding said at least one command over said communication layer to the appropriate gateway and executing said command in said access communication network.

18. Method according to claim 15, wherein said plurality of access communication networks comprises radio access networks as analog Professional Mobile Radio network, digital Professional Mobile Radio Network as TETRA network or TETRAPOL network, Paging system, GMS/UMTS network, wireless broadband access network or Digital Audio Broadcast network.

19. Method according to claim 15, wherein said plurality of access communication networks comprises fixed access networks as PSTN/ISDN networks or wireline broadband access network.

20. Method according to claim 15, wherein said communication layer comprises one or more packet-oriented transport domains with entities for media/data and signaling processing and switching functionality.

* * * * *